July 1, 1958  J. TELLERMAN  2,841,720
FUNCTION SHAPING NETWORK
Filed Feb. 8, 1954
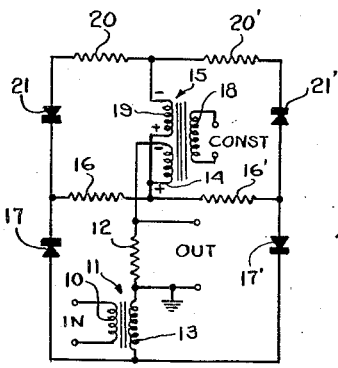
Fig.2.
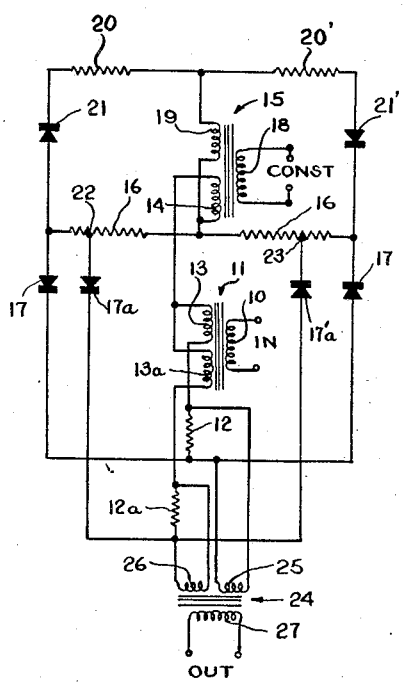
Fig.8.
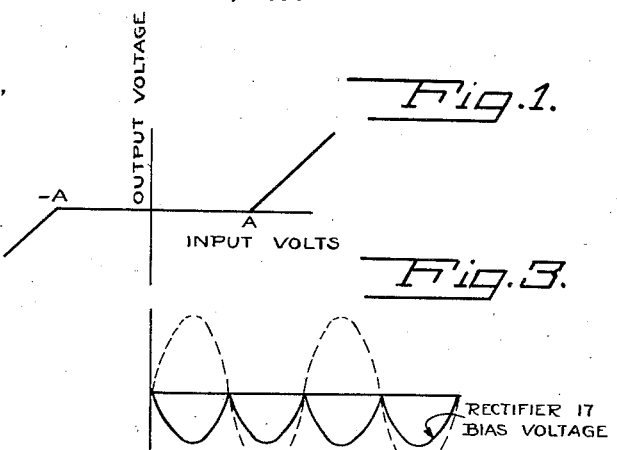
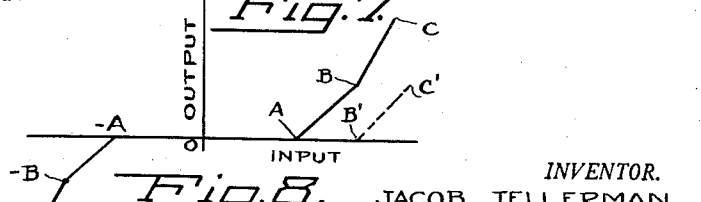
INVENTOR.
JACOB TELLERMAN
BY
Raymond A. Paquin
ATTORNEY.

United States Patent Office 2,841,720
Patented July 1, 1958

2,841,720

FUNCTION SHAPING NETWORK

Jacob Tellerman, Brooklyn, N. Y., assignor to American Bosch Arma Corporation

Application February 8, 1954, Serial No. 408,900

12 Claims. (Cl. 307—107)

The present invention relates to alternating current networks and has particular reference to devices for producing an output signal which is a predetermined function of the input signal.

The basic network of this invention is one which maintains a zero output signal until the input reaches a certain value and then allows the output to increase linearly at a predetermined rate with increasing input signal. As many of these basic networks as required can be combined to give an output comprised of a series of straight lines which approximate any desired function of the input voltage.

A novel feature of this invention is that the network can be made phase-sensitive, i. e. the network can have one output function for an input voltage of one phase and an entirely different output function for an input voltage of opposite phase. Another novel feature of this circuit is that it operates directly on the A. C. signal without recourse to initial rectification, as in prior circuits for the same purpose.

Basically, the network contains a reference voltage, a rectifier and an output element connected in series with the input signal terminals. The rectifier is biased by the reference voltage to be non-conductive for input signals below a certain value. For greater input signals the rectifier will be conductive and the current in the output element will rise linearly with input voltage. The output of this basic circuit resembles a half wave rectified signal. For a full sine wave output two similar circuits are connected in parallel, one circuit being responsive on one half-cycle of input signal, the other circuit being responsive on the other half-cycle of input voltage.

The method of biasing the rectifier is one of the novel features in the invention. For one half cycle of reference voltage the diode is biased merely by the reference voltage alone. For the opposite half cycle of reference voltage, which would normally cause the rectifier to be conductive, a voltage such that the diode remains biased beyond conductive level is added in series with the reference voltage.

For phase sensitivity this added voltage may be chosen so that the characteristics of the network are different for opposite phases of input signals. The added voltage can be such that the output signal is zero for one phase of input, if desired.

For a better understanding of this invention, reference may be had to the accompanying diagram, in which Figure 1 shows the relationship between the output and input signals in the basic circuit.

Figure 2 shows a basic circuit for obtaining a full wave output signal,

Figure 3 shows the voltage time relationship for one control rectifier of the circuit of Fig. 2, Figure 4 shows the output signal form for a portion of the circuit of Fig. 2, Figure 5 shows the normal voltage relationship of both control rectifiers of Fig. 2, Figure 6 shows the normal full wave output of Fig. 2, Figure 7 shows the voltage relationships of the control rectifier for a phase sensitive circuit, Figure 8 shows an output characteristic different from Fig. 1, Figure 9 shows a complete circuit for obtaining the output characteristic of Fig. 8.

The output characteristic of the basic circuit of this invention is shown in Figure 1, where the output voltage is zero for input voltage values below a predetermined value, A, and where the output voltage rises linearly for input voltage values above this predetermined value.

This type of characteristic may be obtained in the circuit shown in Figure 2, where the input signal is applied to energize the primary winding 10 of transformer 11 and the output voltage is taken across the resistor 12. The secondary winding 13 of transformer 11 is connected in series with resistor 12, secondary winding 14 of transformer 15, resistor 16 and rectifier 17. The primary winding 18 of transformer 15 is energized by a constant alternating voltage.

Connected in series across resistor 16 are the secondary winding 19 of transformer 15, resistor 20 and a rectifier 21.

The operation of the circuit thus far described will be considered first, assuming the polarities of the reference voltages at the secondary windings 14 and 19 to be as shown in the figure.

The polarity of the voltage across rectifier 17, which has its cathode connected to the cathode of rectifier 21, is governed by the polarities and magnitudes of the outputs of transformer windings 13 and 14, and by that portion of the output voltage of winding 19 which appears across resistor 16 as a result of the voltage dividing action of resistors 16 and 20. For the assumed polarity of reference voltage, rectifier 21 is polarized to be non conductive, so that there is no current in the loop containing resistors 16 and 20 and secondary winding 19, and no portion of the voltage output of transformer winding 19 appears across resistor 16.

It will be seen that when the output voltage of winding 13 has the same polarity as the output of winding 14 rectifier 17 will remain non-conductive and no output voltage is developed across resistor 12. Also, when the output of winding 13 has the opposite polarity but is lesser in magnitude than the output of winding 14, rectifier 17 will remain non-conductive and no voltage will appear across resistor 12. However, when the output of winding 13 has a magnitude greater than that of winding 14, and is of opposite phase, rectifier 17 becomes conductive and the current through resistor 12 is proportional to the difference between the voltages of windings 13 and 14. The output voltage, taken across resistor 12, therefore remains at zero for all values of input voltage below a certain critical value and increases with the input above that value. The critical value is the reference voltage output of winding 14.

For the opposite phase of reference voltage, the voltage at winding 14 would not cause rectifier 17 to be non-conductive. Therefore, the winding 19 is used to supply a voltage in series with and in opposition to that of winding 14 and of twice its magnitude so that rectifier 17 remains non-conductive until the input signal reaches the value which caused conduction on the opposite phase of reference voltage. Thus, rectifier 21 becomes conductive when the phase of the reference voltage is opposite to that shown in Fig. 2, and a portion of the output voltage of winding 19 appears across resistor 16. Since the windings 19 and 14 are effectively connected in series opposition, the bias voltage across rectifier 17 which must be overcome by the output of winding 13 before an output voltage is produced is the difference between the voltage output of winding 14 and that portion of the voltage output of winding 19 which appears across resistor 16.

Figure 3 shows graphically the condition of voltage across rectifier 17. In this figure, net voltages above the axis cause conduction while voltages below the axis will not allow conduction. The bias voltage on rectifier 17 is represented by the solid curve, while a signal voltage (at winding 13) is represented by the dotted curve. It will be seen that conduction will occur during the first and third half-cycle of signal voltage, producing an output voltage such as that shown in Figure 4. For a signal of opposite phase, conduction will occur on the second and fourth half-cycle of signal voltage so that as described the device is not phase-sensitive.

However, the device can be made phase sensitive simply by increasing the output of winding 19 so that the rectifier 17 bias voltage on the second and fourth half cycles of Figure 3 is much greater than any expected signal voltage. Then the output signal for an input of one phase is as shown in Figure 4 while for an input of opposite phase there is no output signal.

The form of the output voltage of the circuit thus far described resembles a half wave rectified voltage since an output appears only on the half wave of input which will cause rectifier 17 to become conductive. For a full sine wave output, rectifier 17' and resistor 16' are connected across rectifier 17 and resistor 16 with rectifier 17' polarized in the opposite direction to rectifier 17. Also, rectifier 21' and resistor 20' are connected in series with transformer winding 19 and resistor 16', with the polarity of the rectifier 21' opposite to that of rectifier 21.

With this connection a full sine wave output can be obtained across resistor 12 for either polarity of input voltage. It will be seen that for optimum operation the reference and input signals must be of equal frequency and in-phase, or 180° out of phase.

The curves of Figure 5 illustrate the action of the circuit. The solid curve is the bias voltage across rectifier 17, the dashed curve is the input signal and the dotted curve is the bias voltage across rectifier 17'. Net voltages above the axis will cause conduction through rectifier 17 while net voltage below the axis will result in conduction through rectifier 17'. The output voltage, therefore appears as in Figure 6 for the signal shown in Figure 5. For a signal of opposite phase, the output voltage will also be of opposite phase.

If phase sensitivity such that an input voltage of one phase produces an output voltage at a different magniture of signal than an input voltage of the opposite phase is desired, the magnitude of the portion of the voltage of winding 19 which appears across resistors 16 and 16' when rectifiers 21 and 21' respectively are conducting can be made different from that of the magnitude of the voltage of winding 14.

Referring to Figure 7, the bias voltage across rectifier 17 is shown by the solid curve, the bias voltage across rectifier 17' is shown by the dotted curve, and the input voltage is shown by the dashed curve. The output voltage for the input of Figure 7 is identical with that shown in Figure 6. For the opposite phase of input voltage however, the bias voltage is not overcome by the signal and there will be no output signal.

Another desired function between intput and output signals may be OABC of Figure 8. This type of output function can be obtained by adding the output of a circuit having an output characteristic OB'C to the output of a circuit having an output characteristic OAB such as that shown in Fig. 2 for example.

The complete circuit is shown in Figure 9, where the components similar to those used in Figure 2 are similarly numbered.

The input transformer 11 has an additional secondary winding 13a which is connected at one end to the junction between transformer windings 13 and 14, and is connected at the other end through resistor 12a to oppositely polarized rectifiers 17a and 17'a which are in turn connected to points 22 and 23 on the resistor 16 and 16' respectively. An output transformer 24, having primary windings 25 and 26 respectively energized by the voltages across output resistors 12 and 12a, is provided to combine the signals across the output resistors into a single output which is the sum of the individual outputs. Other summing methods may be employed if desired, however.

It will be seen that for the circuit of Figure 9 there will be an output voltage similar to that shown in Figure 1 across each resistor 12 and 12a. The point A of Figure 8 is determined by the relative value of the voltages at windings 13 and 14 while the point B'O of Figure 8 is determined by the relative values of the voltages at windings 13' and 14. The slopes of the output function are determined by the transformation ratios of transformers 11 and 24.

I claim:

1. In a device of the character described, a pair of input terminals, an alternating input signal applied to said terminals, a network containing a reference voltage, a rectifier and an output element connected in series with the intput terminals, said rectifier being biased by the reference voltage to be non-conductive for input signals below a certain value and conductive for greater input signals, the current in the output resembling a half wave rectified signal and said reference voltage being a periodic unidirectional voltage of twice the frequency of the input signal and comprising sinusoidal half cycles.

2. In a device of the character described, a pair of input terminals, an alternating input signal applied to said terminals, a pair of signal circuits connected in parallel, each of said circuits comprising a network containing a reference voltage and a rectifier connected in series with an output element and the input terminals, said rectifiers being biased by the reference voltage to be non-conductive for input signals below a certain value and conductive for greater input signals, one circuit being responsive in one half-cycle of input signal and the other circuit being responsive on the other half of input voltage, and said reference voltage being a periodic unidirectional voltage of twice the frequency of the input signal and comprising sinusoidal half cycles.

3. In a device of the character described, a network containing a reference voltage, a rectifier and an output element connected in series with the input terminals, said rectifier being biased by the reference voltage to be non-conductive for intput signals below a certain value and conductive for greater input signals, the current in the output resembling a half wave rectified signal, said rectifier being biased for half cycle of reference voltage by said reference voltage and for the opposite half cycle of reference voltage such that the rectifier remains biased beyond conductive level.

4. In a device of the character described, a pair of signal circuits connected in parallel, each of said circuits comprising a network containing a reference voltage, a rectifier and an output element connected in series with the input terminals, said rectifier being biased by the reference voltage to be non-conductive for intput signals below a certain value and conductive for greater input signals, the current in the output resembling a half wave rectified signal, one circuit being responsive on one half-cycle of input signal and the other circuit being responsive on the other half of input voltage, said rectifier being biased for half cycle of reference voltage by said reference voltage and for the opposite half cycle of reference voltage such that the rectifier remains biased beyond conductive level.

5. In a device of the character described, a network containing a reference voltage, a rectifier and an output element connected in series with the input terminals, said rectifier being biased by the reference voltage to be non-conductive for input signals below a certain value and conductive for greater input signals and the current in the output rising linearly with input voltage, and said reference voltage being a periodic unidirectional voltage of twice the frequency of the input signal and comprising sinusoidal half cycles.

6. In a device of the character described, a network containing a reference voltage, a rectifier and an output element connected in series with the input terminals, said rectifier being biased by the reference voltage to be non-conductive for input signals below a certain value and conductive for greater input signals, the current in the output resembling a half wave rectified signal and rising linearly with the input voltage, and said reference voltage being a periodic unidirectional voltage of twice the frequency of the input signal and comprising sinusoidal half cycles.

7. In a circuit for producing an output signal voltage having a predetermined relationship to an input signal voltage, the combination of said input signal voltage, a reference voltage and an output impedance connected in a series circuit, rectifier means and a second impedance connected in series across said series circuit, second reference voltage and second rectifier means connected across said second impedance, third rectifier means and third impedance connected across said series circuit, fourth rectifier means connected in series with said second reference voltage and said third impedance, and said reference voltage being a periodic unidirectional voltage of twice the frequency of the input signal and comprising sinusoidal half cycles.

8. In a circuit for producing an output signal voltage having a predetermined relationship to an input signal voltage, the combination of said input signal voltage, a reference voltage and an output impedance connected in a series circuit, rectifier means and a second impedance connected in series across said series circuit, second reference voltage and second rectifier means connected across said second impedance, an input transformer having a primary winding energized by said input signal and a plurality of secondary windings, a plurality of series circuits each comprising rectifying means, impedance means and one of said secondary windings, a reference voltage, a second impedance means, second reference voltage connected across said second impedance through second rectifying means, several electrical connections between said first reference voltage, said second impedance means and each of said series circuits, transformer means connected to each of said first impedance means, third rectifier means and third impedance connected across said series circuit, fourth rectifier means connected in series with said second reference voltage and said third impedance.

9. In a device of the character described, a pair of input terminals, an alternating signal applied to said terminals, rectifying means, an output element, a pair of bias voltage supplies, the first of said bias supplies producing an alternating bias voltage of the same frequency as said signal voltage, the second of said bias supplies producing a half wave rectified bias voltage and electrical connections for connecting said terminals, said rectifying means, said bias supplies and said output element in series.

10. In a device of the character described, a pair of input terminals, an alternating signal applied to said terminals, rectifying means, an output element, a pair of bias voltage supplies, the first of said bias supplies producing an alternating bias voltage of the same frequency as said signal voltage, the second of said bias supplies producing a half wave rectified bias voltage and electrical connections for connecting said terminals, said rectifying means, said bias supplies and said output element in series, second rectifying means, a third bias supply producing a half wave rectified bias voltages, series electrical connections between said input terminals, said second rectifying means, said third and first bias supplies and said output element.

11. In a device of the character described, a pair of input terminals, an alternating signal applied to said terminals, rectifying means, an output element, a pair of bias voltage supplies, the first of said bias supplies producing an alternating bias voltage of the same frequency as said signal voltage, the second of said bias supplies producing a half wave rectified bias voltage and electrical connections for connecting said terminals, said rectifying means, said bias supplies and said output element in series, second rectifying means, a third bias supply producing a half wave rectified bias voltage, series electrical connections between said input terminals, said second rectifying means, said third and first bias supplies and said output element, said first and second rectifying means being oppositely poled and said second and third bias supplies being operative on opposite half cycles of said signal voltage.

12. In a circuit for producing an output signal voltage having a predetermined relationship to an input signal voltage, an input transformer having a primary winding energized by said intput signal and a plurality of secondary windings, an alternating reference voltage supply, an impedance element having taps connected in series with said reference voltage supply, a second alternating reference voltage supply and a rectifier connected in series across said impedance element, a plurality of output impedances, a plurality of rectifying means, a plurality of series circuits each including one of said output impedances, one of said rectifying means and one of said secondary windings, each of said series circuits between said first reference voltage supply and one of said taps on said impedance element.

References Cited in the file of this patent

UNITED STATES PATENTS

| | | |
|---|---|---|
| 2,454,807 | Kennedy | Nov. 30, 1948 |
| 2,581,124 | Moe | Jan. 1, 1952 |
| 2,625,662 | Gaynor | Jan. 13, 1953 |
| 2,697,201 | Harder | Dec. 14, 1954 |